United States Patent [19]

Tasaki

[11] Patent Number: 5,506,411
[45] Date of Patent: Apr. 9, 1996

[54] OPTICAL READER WITH IMPROVED RESPONSE TO CHANGE IN REFLECTED SIGNAL

[75] Inventor: Shinichi Tasaki, Toda, Japan

[73] Assignee: Opticon, Inc., Orangeburg, N.Y.

[21] Appl. No.: 175,247

[22] Filed: Dec. 29, 1993

[51] Int. Cl.$^6$ .................................................... G06K 7/10
[52] U.S. Cl. .................................. 250/568; 250/214 AL; 235/462
[58] Field of Search .............................. 250/568, 214 R, 250/214 P, 214 A, 214 AL, 214 B; 235/461, 462, 463

[56] References Cited

U.S. PATENT DOCUMENTS

| | | | |
|---|---|---|---|
| 4,335,301 | 6/1982 | Palmer et al. | 235/462 |
| 5,142,130 | 8/1992 | Sato | 235/462 |

*Primary Examiner*—Edward P. Westin
*Assistant Examiner*—Que T. Le
*Attorney, Agent, or Firm*—Henry I. Schanzer

[57] ABSTRACT

An optical reader, such as a bar code reader, includes improved circuitry to enable the bar code reader to respond more quickly and more accurately to signal variations due to changes in the ambient light condition and in the contrast presented by the information being read. In particular, the reader includes "slice" circuitry to sense the transitions of signals corresponding to the black-to-white and white-to-black edges of a bar code. The slice circuit includes two ideal diodes whose inputs are connected to an analog input terminal and whose outputs are respectively connected to first and second capacitors to sense and peak detect the values of increasing and decreasing signals. Two diodes are connected in series between the postive peak detector and the negative peak detector and the junction of the two series connected diodes functions as an output terminal at which is produced a reference voltage applied to a comparator. An analog signal, corresponding to the information being read, is applied to the slice circuit and to the comparator whose ouptut follows rapidly and faithfully the analog signal.

17 Claims, 10 Drawing Sheets

OPTICAL READER WITH IMPROVED RESPONSE TO CHANGE IN REFLECTED SIGNAL

BACKGROUND OF THE INVENTION

This invention relates, to an optical reading device and, in particular, to an optical reading device, such as a bar code scanner, capable of accurately and quickly reading information, such as a bar code, over a wide range of contrast and ambient light conditions. This invention also relates to improved circuit means enabling the optical reading device to respond quickly and accurately.

In the description to(follow bar code scanners are used to explain the invention. However it should be understood that this is done for purpose of illustration, and that the invention has applicability to any suitable type of optical reader. Furthermore the circuit of the invention has general applicability.

Bar code scanners and like optical information reading devices, are typically required to operate under conditions where the ambient light can vary greatly. For example, these devices may be required to operate in warehouses where there is little if any ambient light, as well as in areas of bright sunlight. In addition, bar code scanners are needed to operate under widely different contrast conditions. An example of a "high contrast" condition occurs when the label or background is a clear white and the bars are very black (or vice-versa). A "Row contrast" condition occurs, for example, when the bars are "grayish" rather than black and/or when the background is not a clear white or is in fact of another color. To accurately read bar code data over a wide range of ambient light and contrast conditions presents significant problems. The nature and extent of these problems may be better explained with reference to a known CCD bar code scanner, shown in FIG. 1.

The bar code scanner of FIG. 1 includes a housing (1) in which is mounted a light source (2) to illuminate a bar code carrier (L) which may be a label or any medium to which is affixed a bar code; where a bar code includes a number of parallel white and black bars of different width and spacing. As is known in the art determining the number of bars, their widths and the spacing between the bars is critical to determining the types of code and the information being read. As may be seen from FIGS. 1 and 2, light reflected from the bar code carrier (L) is imaged onto a mirror 3 which projects the light via a lens and aperture system (4) onto a CCD image sensor (5). The CCD sensor (5) is controlled via clocking and timing circuitry contained in a signal processor (6). The data signals produced by the CCD sensor (5) are coupled to an analog signal processing section contained in processor (6) which processes the outputs of the CCD sensor for application to a microprocessor or controller (7). The controller (7), which may be part of processor (6), is used to calculate the number of bars read, the width of the bars and the spacing between the bars to determine the validity of the bar code data just read and the data information within the bar code just read.

FIG. 2A shows three (3) bars of a bar code and idealized signals typically produced and/or desired to be produced by the signal processing circuitry (6) in preparation of the application of the signals to the processor (7). The waveforms B, B1, B2 and B3 represent idealized output signals ("OS") of the CCD sensor (5) for various ambient light and contrast conditions. Idealized waveforms C, C1, C2 and C3 represent the envelope of the signals (corresponding respectively to waveforms B, B1, B2 and B3), produced at an output 63 of a low pass filter 6B (see FIG. 3). Idealized waveforms D, D1, D2 and D3 represent signals produced at an output 65 of a comparator 6D (see FIG. 3). As discussed below, it is an object of the circuits and systems of the invention to produce signal responses approaching the idealized condition.

An examination of the waveforms B, B1, B2, and B3 of FIG. 2A indicates the following. For a high contrast, high ambient condition the difference "h1" between the "dark" and "light" bars of a bar code is well defined, and the signal spans the voltage range $V_A$ to $V_B$. For a low contrast, high ambient light condition, the difference "h2" betweenn the "dark" and "light" bars of a bar code is small (peak-to-peak signal is small) and the signal rides on, or near, a "low" voltage level, shown as $V_B$ FIG. 2A. For a low contrast low ambient light condition, the difference "h3" between the "dark" and "light" bars of a bar code is very small (i.e. peak-to-peak signal is small) and the signal rides on, or near, a "high" voltage level, shown as $V_A$ FIG. 2A. For a high contrast, low ambient condition the difference "h4" between the "dark" and "light" bars of a bar code is well defined (i.e the peak-to-peak signal is well defined), however the signal rides on, or near, a "high" voltage level, shown as $V_A$. This examination reveals that the output signal from the CDD may vary greatly in amplitude from a very small peak-to-peak value to a very large peak-to-peak value and that the signal may ride on a voltage level which shifts from a "low" voltage level (e.g. $V_B$) to a "high" voltage level (e.g. $V_A$). Processing these signals accurately and reliably is highly problematic, particularly when the signal may shift through all the variations discussed above during the scan of a single bar code.

Problems associated with the processing of the signal are further explained with reference to FIG. 3. FIG. 3 shows an analog signal processing circuit disclosed in my co-pending application titled OPTICAL READER EMPLOYING LOGARITHMIC AMPLIFIERS, filed Dec. 27, 1993 and whose Ser. No. is 08/174,159, the teachings of which are incorporated herein by reference.

Referring to FIG. 3 note that the image sensor (5) also referred to herein as a CCD sensor or CCD imager, has an output signal (OS) terminal which is applied to the data signal input terminal 61 of the analog data processing circuitry of circuit (6).

The output signal (OS) of the sensor 5 is applied to node 61 to which is connected the inputs of logarithmic ("log") amplifiers 6A1 and log amplifier 6A2. (The outputs of log amplifiers 6A1 and 6A2 are connected to a terminal 62. One of the logarithmic amplifiers (e.g. 6A1) is designed to primarily respond to, and handle, high frequency components of the "OS" signal and the other logarithmic amplifier (e.g. 6A2) is designed to primarily respond to, and handle, the lower frequency components of the "OS" signal. The combination of the two "log" amplifiers and the use of dual paths to process and transfer the signal results in a significantly improved performance.

The outputs of logarithmic amplifiers 6A1 and 6A2 are summed at node 62 and applied to a low pass filter 6B. An output of low pass filter 6B is produced at output 63 which is then applied to an input of a linear amplifier 6C. An output of linear amplifier 6C is applied to a signal input of comparator circuitry 6D and to a slice signal generating circuit 6E. An output 66 of the slice signal generating circuit 6E is applied to comparator 6D. Slice generator 6E functions to determine the ½ point between the peak to peak amplitude of the signals at the output of amplifier 6C. The ½ point is then used as the comparison point for comparator circuit 6D which then generates data "high" and data "low". The slice circuit in combination with the comparator acts as a 1 bit analog-to-digital (A/D) converter. In one sense the slice generator functions as a transition detector. That is the slice circuits is used to sense and indicate the positive going and negative going transitions of the bar code signal. The slice circuit in combination with comparator circuit 6D is used to generate digital pulses which are proportional to the bar code width and are an electronically accurate rendition of the bar code.

As suggested above, the "slice" generator is used to detect the transition from black to white and white to black read by the bar code reader. This function is critical to determine the width and spacing of the black and white bars. To further appreciate the problems resolved by the invention reference is now made to FIGS. 4 and 5 which show prior art "slice" generators and to FIG. 6 which shows a waveform of a signal which may be produced at an output of linear amplifier 6C and the problem in detecting its transitions with the prior art circuitry.

Referring to FIGS. 4 AND 5, note that the output 40 in FIG. 4 and the output 400 in FIG. 5 include a resistor capacitive (RC) network which provides a time delay which must be discharged to enable the circuit to respond properly. The RC network must also be charged for the circuit to work properly. Hence slice circuits employing RC networks present a problem at the beginning of a read cycle and during each read cycle when the signal varies rapidly and widely.

The problem with time delays associated with RC time constants is best explained with reference to FIG. 6. The analog signal produced at the output 67 of linear amplifier 6E (see FIG. 3) may be as shown by a solid line ($V_S$) in FIG. 6. Assume that the output 40, or 400, decays slowly as shown by the dashed lines in FIG. 6. When the input signal varies rapidly and widely (as shown by the solid line in FIG. 6), pulses produced at output 65 of comparator 6D (see FIG. 3) will be shortened, as shown in FIG. 6 for period $t_1$ to $t_{1a}$, and pulses may be totally missed as shown for period $t_4$ to $t_7$.

The problem is aggravated because of rapid changes in ambient light conditions and in contrast conditions. These rapid changes cause rapid changes in the peak-to-peak value of the signal ($V_S$) and cause a shift in the dc (or ac) level (range of $V_C$ to $V_D$) about which the signal changes are occurring as illustrated in FIG. 6.

The prior art circuit of FIG. 4 is considered to be a "diode-follower" slice type. FIG. 4 shows an analog input signal coupled via a buffer B1 to a pair of diodes (d1,d2) connected in parallel in opposite conductive directions to each other and a smoothing (filter) network (C1, R1). The output voltage 40 of the filter stores the peak charging and discharging voltages developed across peak holding capacitor C1. The buffer output (V37) and the filter output (V40) are then applied to a comparator 22.

Normally, the output voltage 40 across the peak holding Capacitor (C1) will be $V_F$ volts less than the voltage (V37) at the output of B1 for increasing values of signal and will be $V_F$ volts above V37 for decreasing values of V37; where $V_F$ is the forward voltage drop of diodes d1, d2. However due to the RC time constant (R7, R1, C1) there is a delay before the RC network is charged or discharged towards the input voltage (i.e. V37). This presents a problem in reading a high resolution bar code having a bar whose width is so small that the circuit can not respond to its presence.

The slice circuit shown in FIG. 5 is of the type which is generally referred to as a "center slice" type and includes amplifiers A1, A2; resistors R4, R5, R6; diodes d1, d2; and peak hold capacitors C4, C5.

The output voltage 400 of the slice circuit of FIG. 5 is approximately equal to the center value of the peak voltage values in between the value corresponding to a white bar and the value corresponding to a black bar.

However, the center slice type circuit in FIG. 5 has the following problems and/or drawbacks:

a) The band range of signal which can be sliced depends on the time constant of smoothing (filter) circuitry (C4, C5, R4, R5, R6) and is limited to it. Consequently, the circuit characteristic will be in a narrow band area.

b) As the time constant is fixed, it cannot accurately follow the sudden variations in signal amplitude and frequency resulting from the sudden variations in ambient light. Consequently, the output of the comparator (TTL signal) will be inaccurate causing a high percentage of erroneous and/or missed readings (see FIG. 6).

c) To increase the speed of response of the output voltage 400 the time constant of the filtering circuitry has to be made smaller, and the VF value of the diodes (d1, d2) has also to be smaller. However, this causes the slicing operation to be affected by noise signals resulting from incompletely printed bar codes and/or rough paper surface.

d) On the other hand, if the value of VF and the time constant are increased, a bar code signal containing a signal pulse of a smaller width and a smaller amplitude may not be sliced accurately.

e) When the positive going slope of the slicing signal is moderate, the black bar at the edge of a bar code cannot be recognized. Therefore, the length of a bar code readable electrically is shorter than the length of a bar code readable optically.

f) And for condition of low contrast bar code readable electrically will further be decreased.

g) At the beginning of each scan, when the reader starts reading from a background to the first bar, there will be a distortion. At that time as the slice signal becomes to the same degree as that of the analog signal, TTL signal corresponding to the first bar will be distorted which effects the pulse width to be larger than its accurate value.

h) When ambient light is stronger or the print contrast signal (PCS) is lower, the entire bar code signal will reach extremely near to the white level which makes the signal difficult to follow to the bar code signal. That is, the signal may move towards the level $V_A$ or $V_B$, representing the white levels.

i) The prior art slicing function does not work accurately for a bar code signal of narrow width and small amplitude, such as the analog signal from a bar code having a low resolution ratio.

j) The length of a bar code read electrically will be shorter than the actual length of a bar code read optically.

k) When the print contrast signal (PCS) value is lower the length of a bar code read electrically will further be shorter.

SUMMARY OF THE INVENTION

An object of this invention is to solve the aforementioned problems and/or drawbacks and provide an optical reading device capable of reading quickly and reliably.

Another object is to provide a slice circuit having a wide dynamic range which can respond quickly to the transitions and momentary fluctuations of an analog signal resulting from sudden and transient variations in the ambient light and the contrast level.

Another object of the invention is to provide a slice circuit which can respond quickly, whereby the increased frequency response and dynamic range obtained by use of log amplifiers, as per the above cited pending application, can be extended to the rest of the circuitry of the reading device and results in an improved optical reader.

Still another object of the invention is to expand the range of operation of the slice signal generating circuit by reducing leakage current flow in order to hold the peak rectification hold circuitry, boosting up the holding capacity of the peak value, and reducing the time constant of the peak holding capacitor to a very small value.

BRIEF DESCRIPTION OF THE DRAWINGS

In the accompanying figures, like reference characters denote like components.

DETAILED DESCRIPTION OF THE INVENTION

Figure 1:
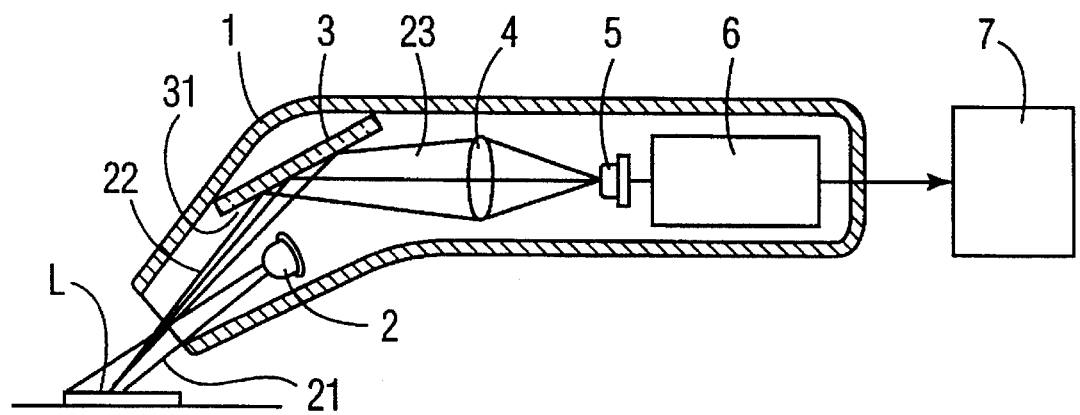
FIG. 1 is a simplified cut-open view of a bar code reader and a bar code.
Figure 2:
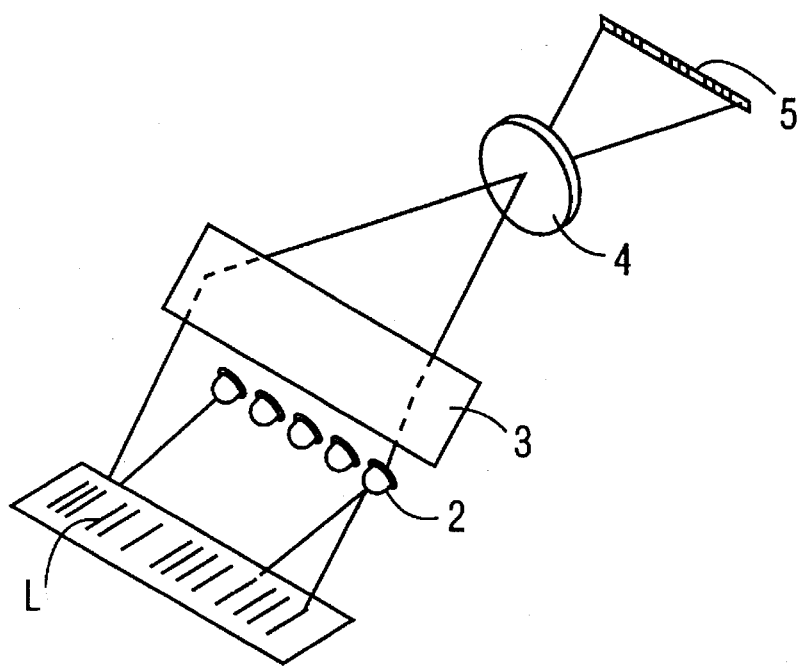
FIG. 2 is a diagram of the optical imaging path of the bar code reader of FIG. 1.
Figure 8:
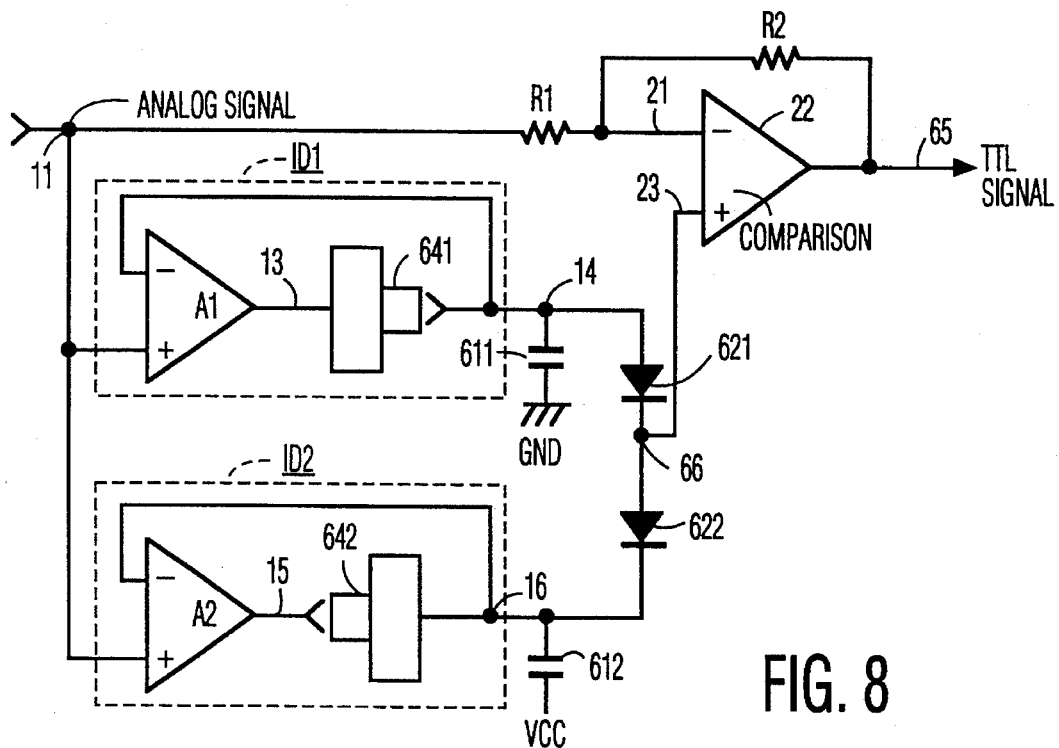
FIG. 8 is a schematic diagrams of a slice generating circuit embodying the invention.

The circuit of the invention shown in FIG. 8 may be used in the analog signal processing circuitry of a bar code reader of the type shown and described in FIGS. 1 and 2. The analog signal processing circuitry of the reader may include the components shown in block form in FIG. 3. The circuit of the invention is intended to improve the performance of the slice signal generator 6E shown in FIG. 3 whereby the overall performance of the reader is improved.

Figure 2A:
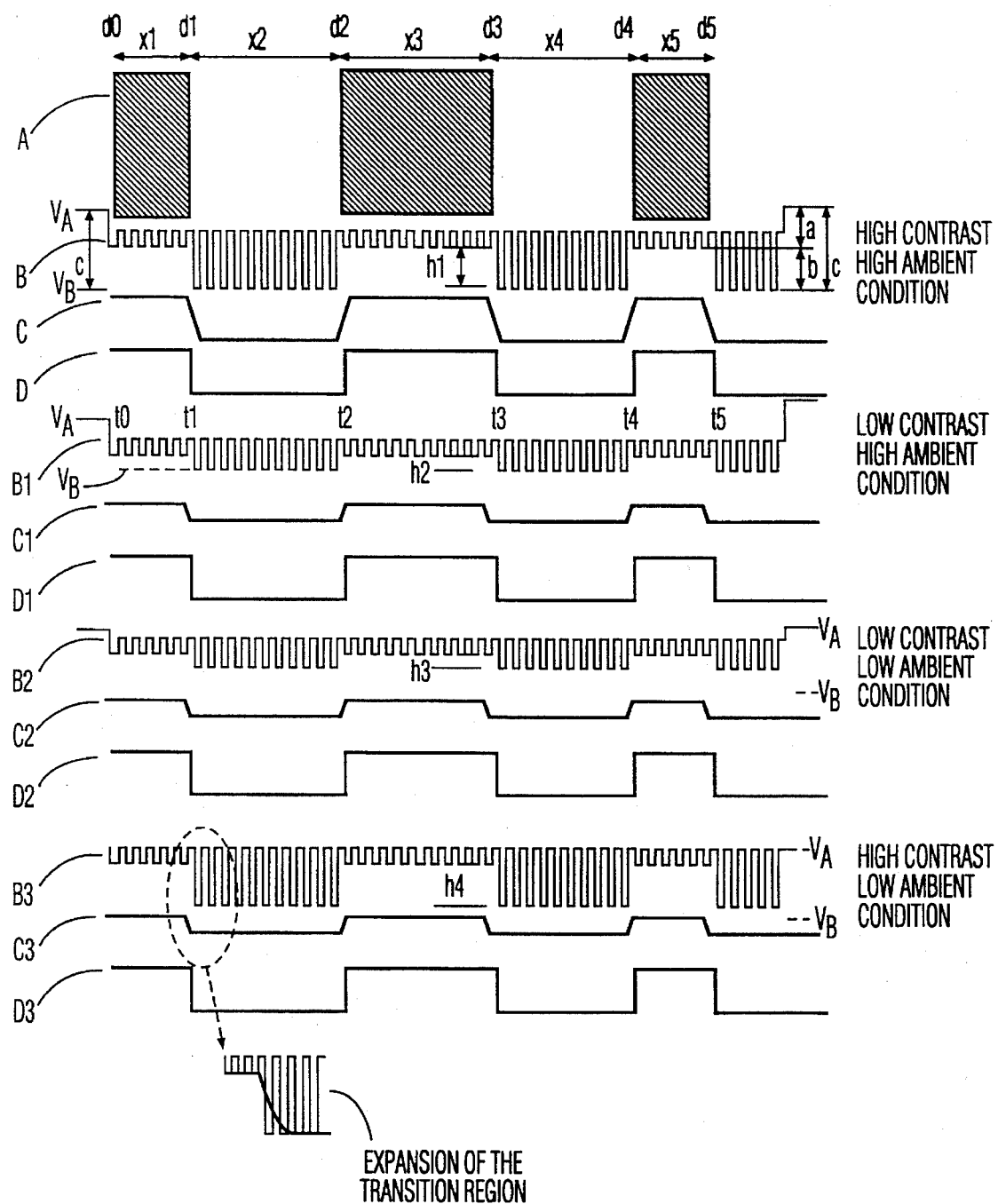
FIG. 2A is a diagram of bar codes and waveforms produced when a bar code is read.
Figure 3:
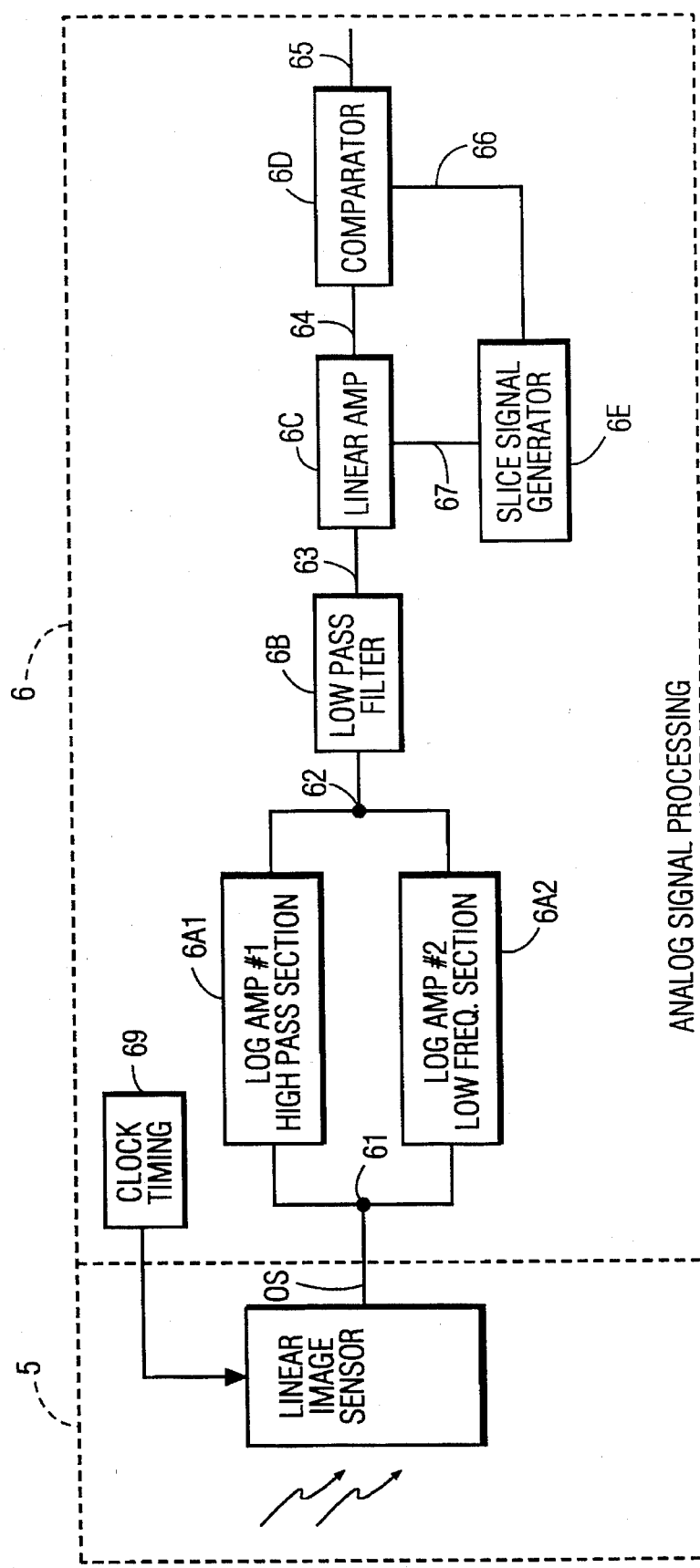
FIG. 3 is a block diagram of an electronic system, suitable for use with the invention.
Figure 4:
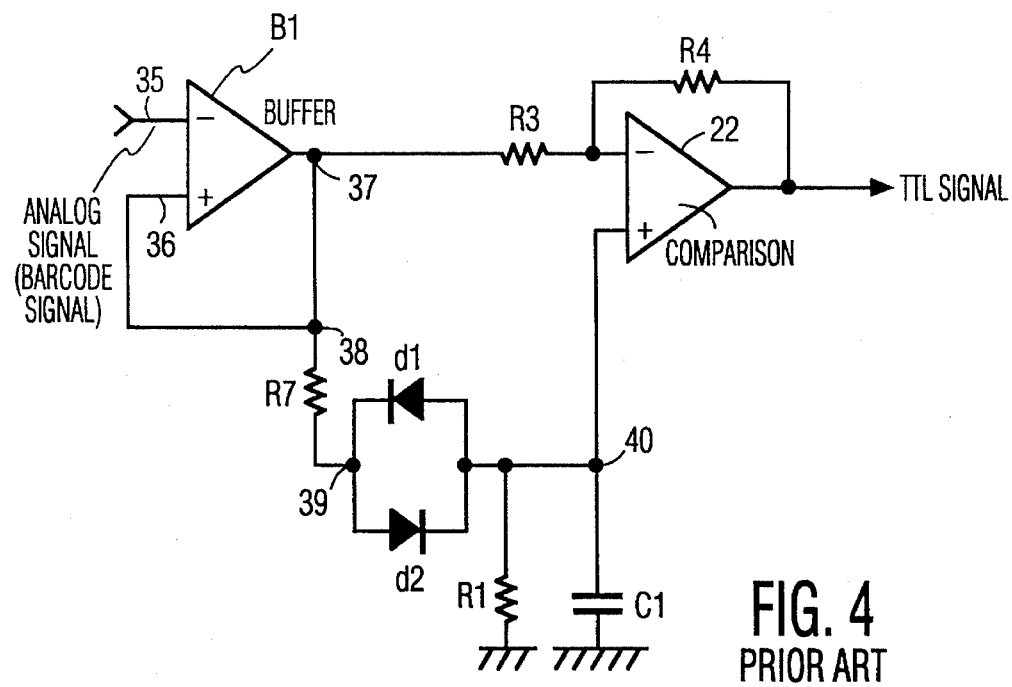
FIGS. 4 & 5 are schematic diagrams of prior art "slice" generating circuits.
Figure 5:
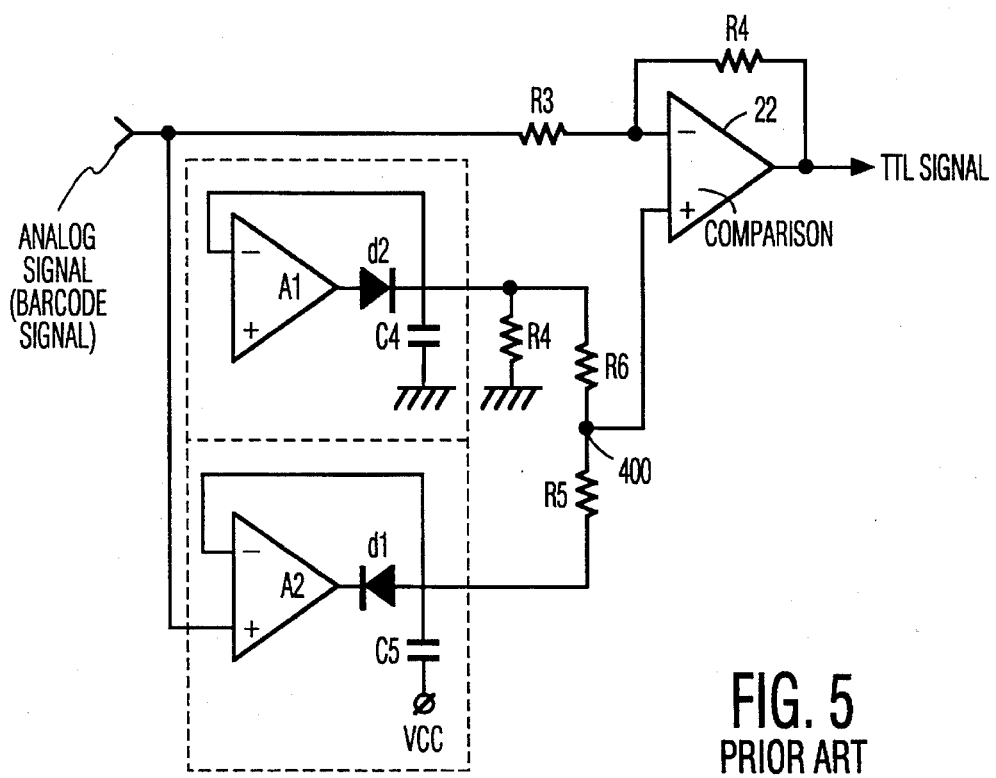
Figure 7A:
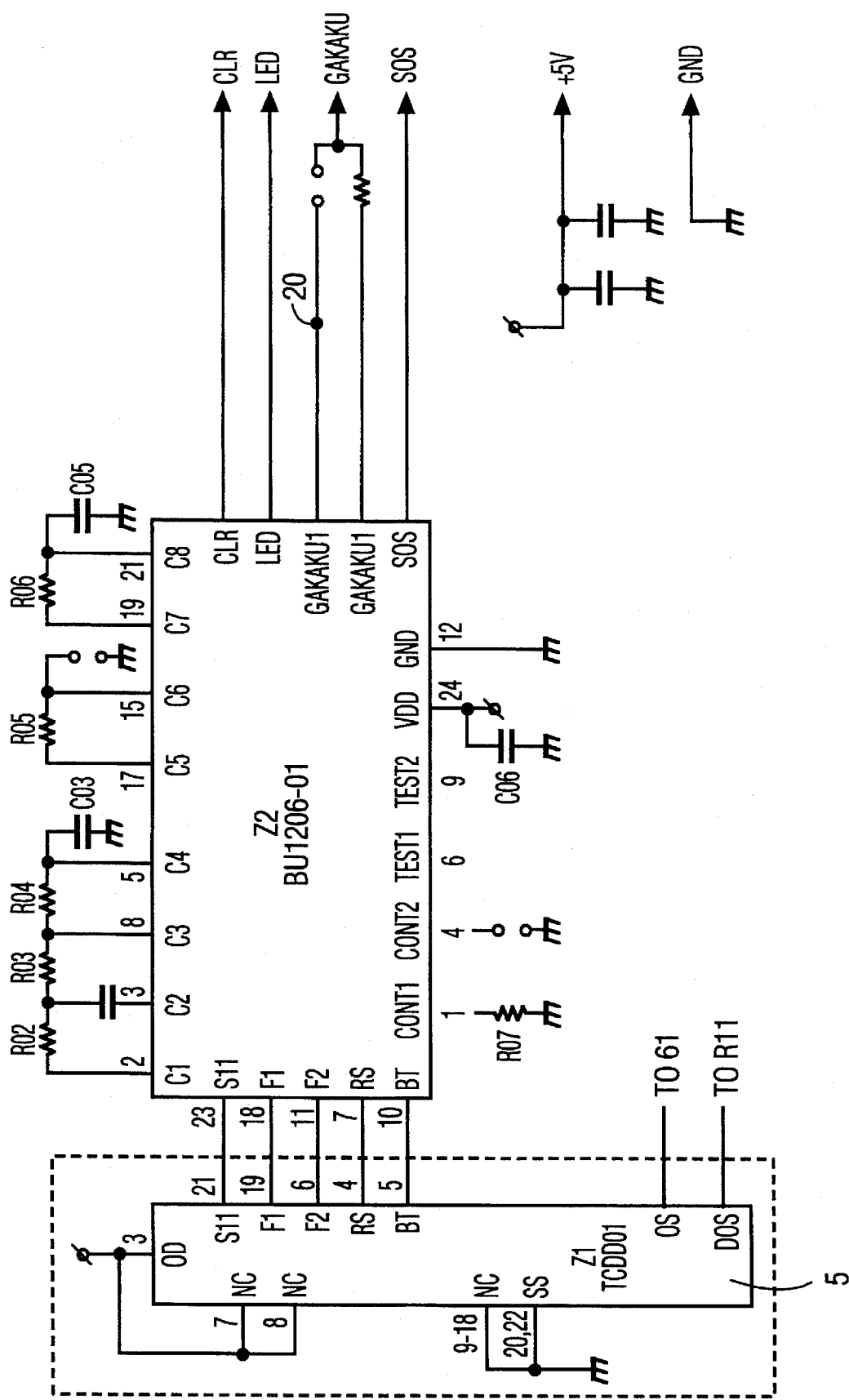
FIG. 7 is a schematic diagram of circuitry suitable for use in sections 6A1, 6A2, 6B, 6C, 6D, and 6E of FIG. 3.
Figure 7B:
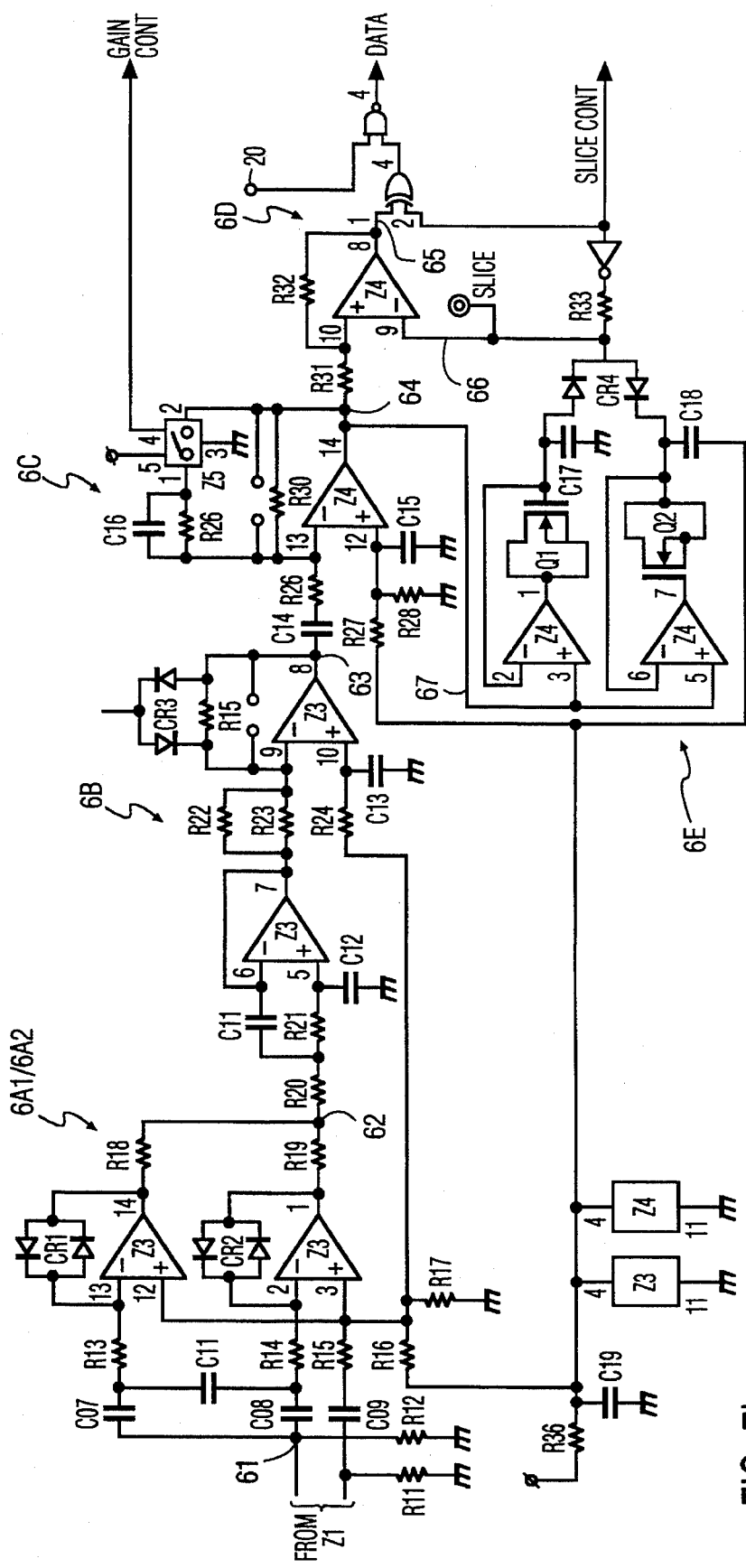

The "slice" circuit shown schematically in FIG. 8 includes an input terminal 11 to which is applied an analog signal produced at an output 64 of a linear amplifier such as that shown as 6C in FIGS. 3 and 7. The analog signal represents bar code information which is "read" (or sensed) by image sensor (5) and may have many different wave shapes as shown, for example in FIG. 2A and in FIGS. 10–13.

In FIG. 8, the analog signal 11 is applied via a resistor R1 to one input 21, of comparator amplifier 22. Comparator amplifier 22 may be any one of a number of operational amplifiers or comparator circuits having two inputs (e.g. 21, 23) and an output 65 at which is produced an output signal (TTL) having one binary value (e.g., high) when the voltage (V21) at input node 21 is greater than the voltage (V23) at input node 23 and an output signal having the other binary value (e.g., low) when V21 is less than V23.

The slice circuit also includes two "ideal" diodes ID1 and ID2. Each "ideal" diode includes an operational amplifier and an actual diode interconnected to provide a function which approximates that of an ideal diode. ID1 includes an operational amplifier A1 connected at its positive (+) input terminal to terminal 11 and a junction field-effect transistor (JFET) 641 connected between an output node 13 of Op-Amp A1 and the ID1 output node 14. JFET 641 is connected to function as a diode poled to conduct (conventional) current from terminal 13 into terminal 14 and to block the flow of (conventional) current from terminal 14 to terminal 13. The voltage generated at node 14 is fed back to the negative (−) input terminal of Op-Amp A1 whereby the combination of Op-Amp A1 and diode connected JFET 641 functions as a near "ideal" diode coupling positive going analog signals present at node 11 to node 14. That is, the voltage (V14) at node 14 follows quickly and with little offset the positive going excursions of the analog input voltage ($V_S$ or V11) applied to node 11.

ID2 includes an operational amplifier A2 connected (like A1) at its positive (+) input terminal to terminal 11. An output 15 of Op-Amp A2 is connected to one terminal of a junction field-effect transistor (JFET) 642 which is connected between nodes 15 and 16 to function as a diode poled to conduct (conventional) current from node 16 to node 15 and to block the flow of (conventional) current from node 15 to node 16. The voltage generated at node 16 is fed back to the negative (−) input terminal of Op-Amp A2 whereby the combination of Op-Amp A2 and diode connected JFET 642 functions as a near "ideal" diode coupling negative going analog signals present at terminal 11 to node 16. That is the voltage (V16) at node 16 follows quickly and with little offset voltage the negative going excursions of the input voltage ($V_S$ or V11) applied to input terminal 11.

A capacitor 611 is connected between terminal 14 and ground to provide charge storage and to hold the peak positive voltage seen at node 11 and coupled via ID1 to node 14. A diode 621 is connected between nodes 14 and the slice generator output terminal 66, with diode 621 being poled to conduct (conventional) current from node 14 into terminal 66. Note that diode 621 is direct current connected with low resistance, between points 14 and 66. The negligible impedance connection ensures very small time constant and high speed of response.

A capacitor 612 is connected between terminal 16 and VCC to provide charge storage and hold the peak negative voltage present at input 11 and coupled via ID2 to node 16. A diode 622 is connected between node 16 and output terminal 66, with diode 622 being poled to conduct (conventional) current from terminal 66 into node 16. Diode 622 is direct current connected with low resistance between points 66 and 16. The negligible impedance connection (like that of diode 621) ensures a very small time constant and high speed of response.

JFETs 641 and 642 are used in FIG. 8 because they can be interconnected to form a unidirectional conducting element, such as a diode, with a relatively low forward voltage drop ($V_F$) and low leakage in the reverse direction. A JFET is preferably used for these reasons. However, a metal-oxide semiconductor (MOS) transistor, or any number of known germanium or silicon diodes, and/or bipolar transistors may also be used to provide the diode function provided by JFETs 641 and 642.

Since circuit output terminal 66 is connected to input terminal 23 of comparator 22, it compares the analog signal input voltage at terminal 11 with the slice circuit output voltage (V66). Comparator 2 has an output 65 at which it produces a "high" level TTL signal when the voltage (V21) at node 21 is more positive than the voltage (V23) at node 23 and at which it produces a "low" level TTL signal when V21 is less positive than V23.

A resistor R2 is connected between the output 65 and input node 21 of comparator 22 to control the gain of the comparator 22.

The operation of the slice circuit is briefly as follows. The same analog input signal (V11) is applied to the two ideal diode circuits ID1 and ID2. When the analog input signal is increasing in a positive direction (i.e. goes positive) the signal at terminal 11 is coupled via ID1 to node 14 which charges up to the increasing value of the signal rapidly and with great fidelity. As the signal increases, capacitor 611 charges to the increasing peak value and tends to hold the peak value. The positive voltage at node 14 is coupled to terminal 66 via diode 621. Consequently, so long as the analog inputs signal is increasing, the voltage (V66) at node 66 will be equal to the signal voltage (V$_S$) at node 14 less the forward voltage drop (V$_F$) of diode 621. Thus V66 and V23 are equal to V$_S$–V$_F$, for increasing values of the analog signal. With V$_S$ greater than V66 and V23, the comparator output 65 is "high".

When the analog input signal decreases (i.e goes negative relative to a previous value) the analog signal at terminals 11 is coupled via ID2 to node 16 which charges to the decreasing value of the signal with great fidelity. As the signal increases in the negative direction (i.e. decreases), capacitor 612 charges to the negative peak value and holds the negative peak value. So long as the analog signal is decreasing the voltage (V66) at node 66 will be equal to the signal voltage (V$_S$) at node 16 plus the forward voltage from (V$_F$) of diode 621. Thus V66 which is also equal to V23 is equal to V$_S$+V$_F$, for decreasing values of the analog signal. With V$_S$ less than V66 and V23, output 65 is "low".

Thus so long as the analog signal at node 11 is increasing and remains at its increased value the voltage at node 21 is greater than that at node 23 and the output 65 is set high and remains high. As soon as the analog signal decreases from the peak value established at node 14 and below the value of (V$_S$–V$_F$) held at node 66, ID2 conducts and the voltage at node 21 drops below the voltage at node 23 and the output 65 is set low. As the input signal goes low, the voltage at node 66 is driven to V$_S$+V$_F$, while V$_S$ is coupled at node 16 charging capacitor 612 to the negative peak value.

Since amplifiers A1 and A2 drive the nodes 14 and 16 respectively via low impedance paths the respective peak holding capacitors, 611 and 612 charge up quickly and discharge quickly providing very little delay and high speed response. Also due to the diode coupling, there is very little loading of one circuit on the other.

A significant advantage of the invention may be best appreciated by the following example. When the input signal is increasing the voltage at node 21 will be approximately equal to the voltage at the input signal. Concurrently the voltage (V14) at node 14 rises to V$_S$ where it will charge peak holding capacitor 611. The voltage (V66) at node 66 will then be equal to V$_S$–V$_F$ and the voltage at node 16 will be equal to V$_S$–2V$_F$; where V$_F$ is the forward diode drop of each one of diodes 621 and 622. For this signal condition ID2 is non-conducting since diode connected FET 642 is reverse based. Therefore these signal conditions are established very quickly due to the drive of Op-Amp A1. Note that ID2 does not conduct until the input signal drops below the value of V$_S$–2V$_F$ previously established at node 16.

Thus when the input signal changes state there is no delay to the change. Furthermore, when the signal decreases from a previous peak value, ID2 begins to conduct when V$_S$ is less than the previous peak value of V$_S$–2V$_F$ on capacitor 612. When ID2 conducts, ID1 is cut off and there is very little load on ID2 establishing a voltage condition of V$_S$ at node 16, V$_S$+V$_F$ at node 66 and V$_S$+2V$_F$ at node 14.

The process just described is repeated when the input signal subsequently reverses course.

The high speed of response and the wide band of the circuit is illustrated in FIGS. 10, 11, 12 and 13 where the input signal (V$_S$) at node 11 is shown in solid line and the slice output voltage V66 is shown as dashed lines.

Figure 10:
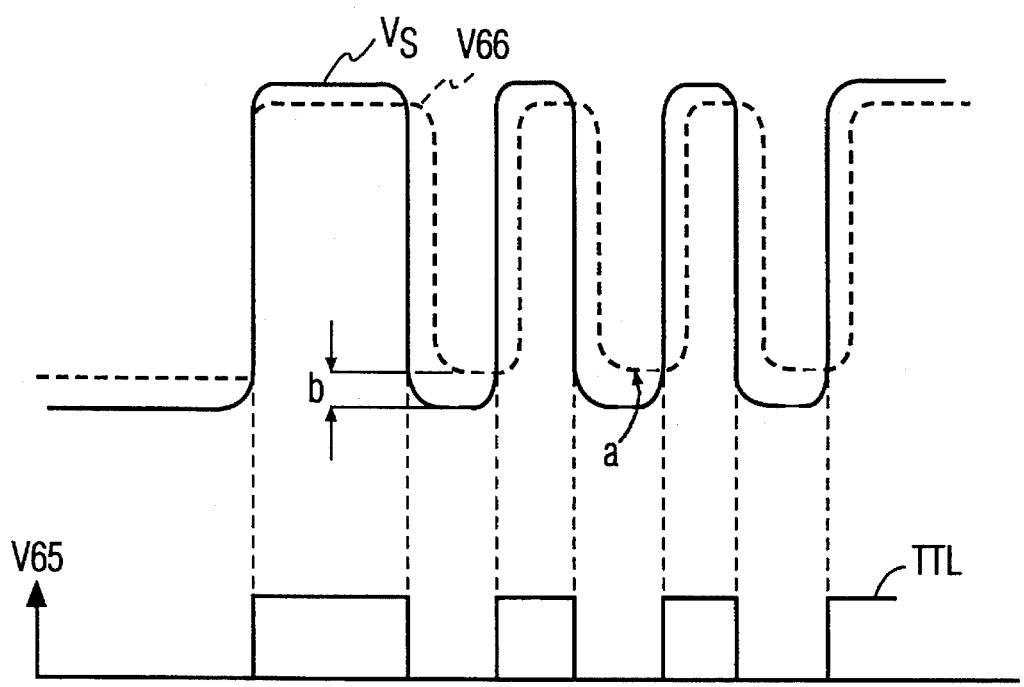
FIGS. 10, 11, 12, and 13 are waveform diagrams illustrating the response of circuits embodying the invention.

FIG. 10 is illustrative of the response resulting from signal condition B in waveform 2A. In FIG. 10 high peak-to-peak input signals (V$_S$) are applied at input node 11 and the output slice signal V66 follows such that the width of the bars and the spaces between the bars is reproduced with high fidelity. FIG. 10 illustrates a signal wave pattern when the amplitude of the analog signal is large. In this case, the slice signal pattern is formed near to the diode follow wave pattern while keeping the peak hold value (a) and holding the voltage difference from the analog signal voltage at the same fixed value.

Figure 11:
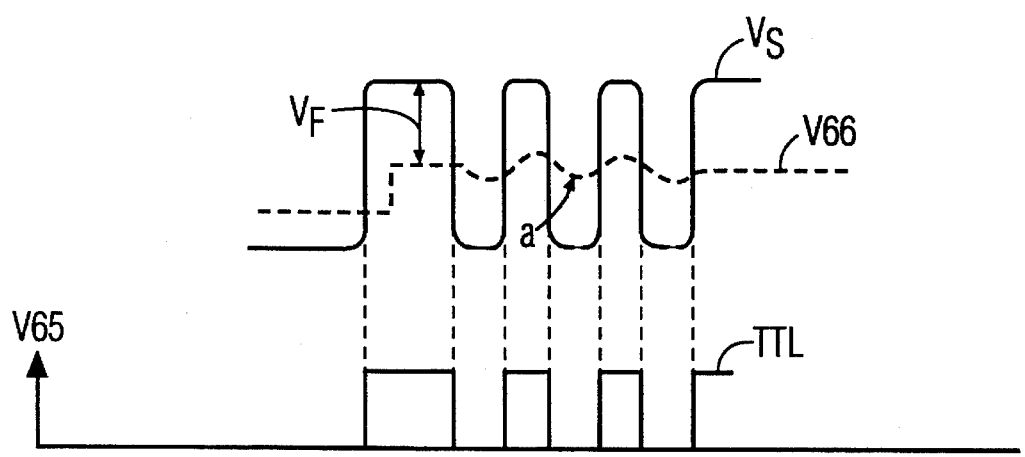

FIG. 11 shows that, for small peak-to-peak signals, the "center" slice output voltage V66 does not move up and down considerably, but provides a level about which V$_S$ goes high and low and produces a comparator output (V65) which quickly and accurately reflects the width of the bars of the bar code and the spacing between the bars. FIG. 11 illustrates a signal wave pattern when the amplitude of the analog signal is small. In this case, the signal wave pattern is formed near to the center slice wave pattern while keeping the peak hold value (a).

Figure 6:
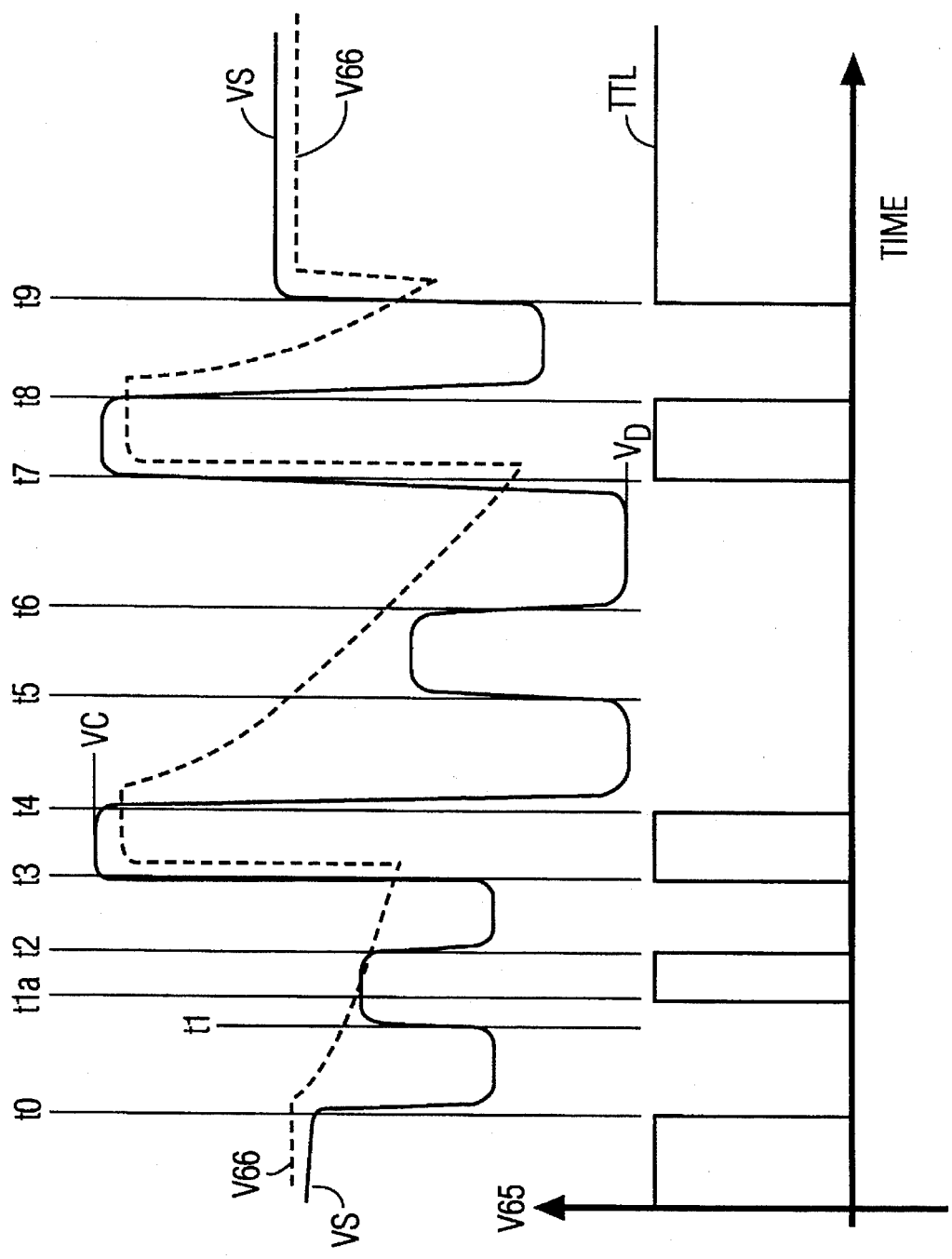
FIG. 6 is a diagram of waveforms illustrating the problem with the prior art slice generating circuits.
Figure 12:
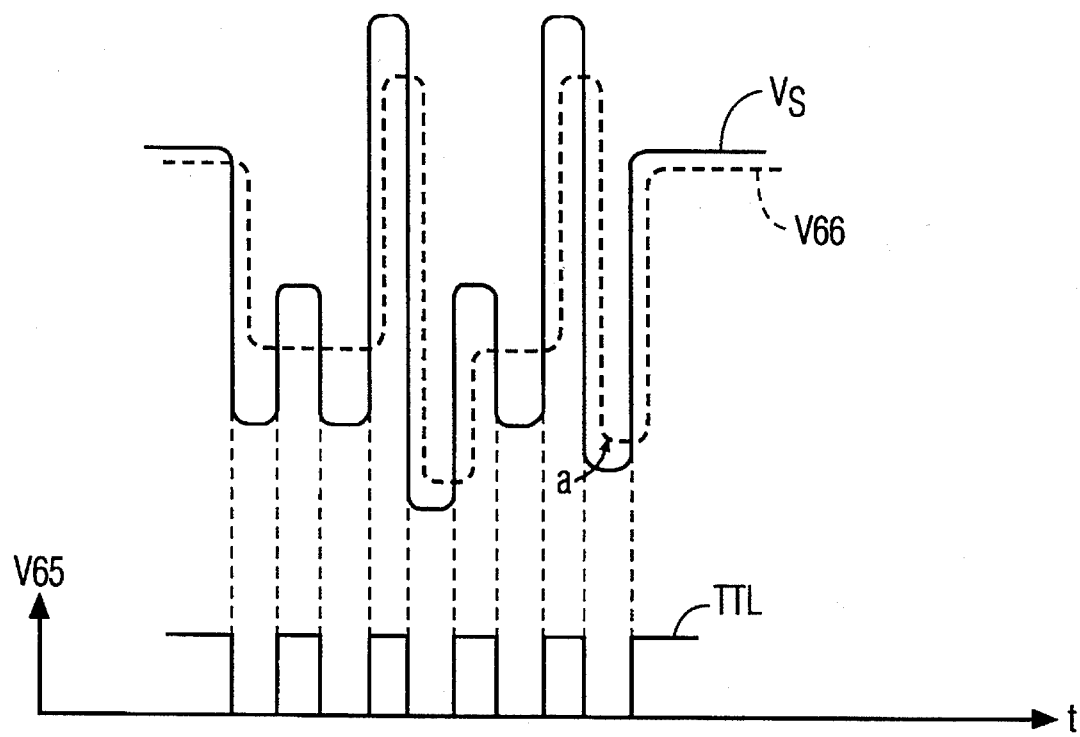

FIG. 12 illustrates a signal wave pattern of the analog signal which varies sharply due to rapid variations of ambient or surrounding light. It illustrates that the slice signal follows quickly and dynamically to the analog signal while keeping the peak hold value (a) and holding the voltage difference from the analog signal voltage at the same fixed value. FIG. 12 shows an analog signal (Vs) comparable to that of FIG. 6, which varies over a wide range and varies very quickly due to ambient and contrast conditions. FIG. 12 shows the quick response of V66 due to the action of the circuit embodying the invention. As a result, the comparator output V65 shown in FIG. 12 indicates the bar code transitions and their widths accurately and with fidelity. Therefore, the problem of shortening and missing pulses illustrated in FIG. 6 is resolved.

Figure 13:
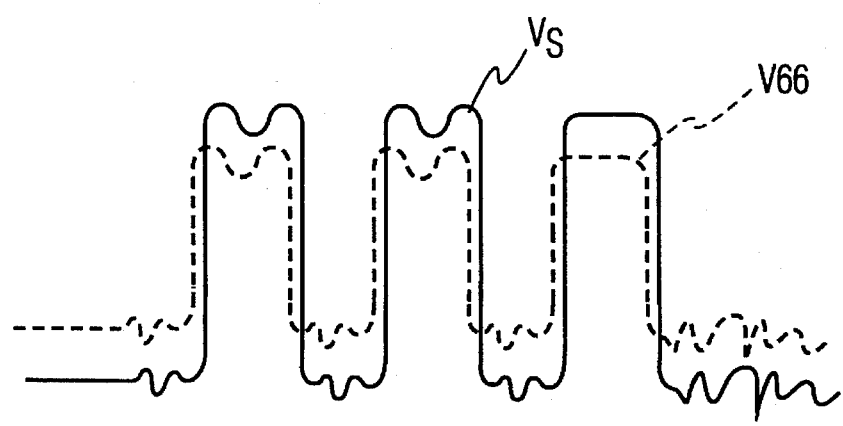

FIG. 13 illustrates a signal wave pattern of the analog signal when it is affected by the noise from the label being read, plus the incomplete printing of the objective bar. As the signal is expanded to wide band area, it follows to these noises. FIG. 13 shows that a noisy analog signal will also be properly processed in circuits embodying the invention.

Thus, in the circuit of FIG. 8, the slice circuitry receives the incoming electric analog signal (bar code signal), and converts the electric analog signal corresponding to a black line bar character to "logic 1" level, and converts the electric analog signal corresponding to a white line bar character to "logic 0" level. According to this invention, novel and original wide dynamic slice circuitry is employed.

In the slice circuitry of FIG. 8 the slice signal voltage at the input terminal of the comparator can, as shown in FIGS.

10–13, follow the analog signal voltage (solid line) automatically without time delay. The voltage difference (b) of the both signals can be kept at a fixed VF value without time delay, as discussed below.

When a positively increasing analog signal corresponding to an object or a white line bar is propagated by the circuitry and appears at terminal 11, the ideal diode (ID1) transmits a signal corresponding to the analog signal to the peak holder capacitor 611, and capacitor 611 will be charged immediately, without time delay, to the peak value of the analog signal. The voltage at terminal 14 will be the same as the analog signal voltage. After the analog signal voltage reaches a peak value, the ideal diode (ID1) will thereafter be nonconductive, and the peak value will be stored on capacitor 611.

During this period, capacitor 611 is rapidly charged through diodes 621 and 622 conducting in series, and diode ID2 is non conductive. The terminal voltage of capaciotr 612 is lower than that of capacitor 611 by 2 times the value of the VF drop across each diode.

During the time period when the analog signal voltage is reaching to peak, the electric potential at the middle point 66 of the diodes (621, 62), i.e the output voltage of the slice signal generating circuitry, is lower than the holding voltage of the capacitor 611 by the VF value of diode 621. Therefore, as shown in FIGS. 10–13, the voltage difference (b) between the analog signal voltage (solid line) of the comparator input terminal and the slice signal voltage (dotted line) will be held almost at the same VF value.

Next, when an increasing negative analog signal corresponding to a black line bar is propagated to terminal 11 and its voltage is more negative than the hold voltage of capacitor 612, the ideal diode (ID2) becomes conductive immediately discharging capacitor 612, without time delay. The terminal voltage of capacitor 612 will be the same as the analog signal voltage corresponding to the black line bar.

When the analog signal voltage reaches to the smallest value (peak value), the ideal diode ID2 will thereafter be not transmissive and this smallest value will be held at capacitor 611. During this period, though the ideal diode ID1 is not transmissive, when the terminal voltage of the lower condenser goes lower than [(the upper condenser 61 holding value)–(two times more of the VF value)], in a very short period of time capacitor 611 will also discharge through the diodes (621, 622). The hold voltage of capacitor 611 is higher than that of capacitor 612 by two times portion of the VF value as a matter of course. During the time period when the analog signal voltage is reaching to the smallest value (peak value), the electric potential at the middle point of the diodes (621, 622), i.e the output voltage of the slice signal generating circuitry, is higher than the hold voltage of the lower condenser by the VF value of the diode (61) as a matter of course. Therefore, the voltage difference between the analog signal voltage of the comparator input terminal and the slice signal voltage will be held almost at the same VF value. And, during the course of the scanning till its end the same processing will repeat.

Figure 9:
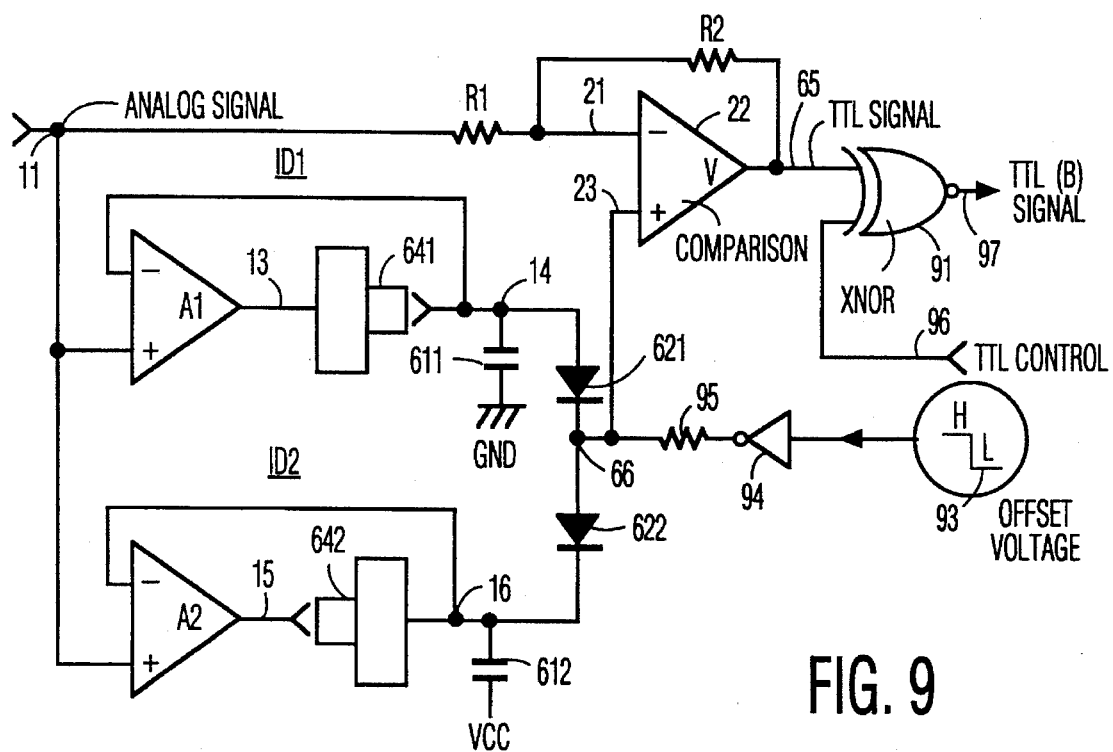
FIG. 9 is a schematic diagram of another circuit embodying the invention.

FIG. 9 is a schenatic diagram of another slice circuit according to this invention. In this circuit, an EXCLUSIVE NOR (XNOR) circuit is connected between output terminal 65 of comparator 22 and an output terminal 97. The response of XNOR 91 is controlled by TTL control signal 96 which is applied to one input of gate 91. The gate 91 is inserted in the circuit to enable the production of a TTL(B) output at terminal 97 which, dependent on the value of the control signal applied to terminal 96, is TTL either in-phase or the logical inverse of the TTL signal at terminal 65.

AN Exclusive-OR (XOR) gate or an Exclusive-NOR (XNOR) gate produces an output having one binary value [e.g., H level (logic 1)] when both inputs are both at the H level or both at the L level (logic 0), and an output having the other binary value [e.g., L level (logic 0)] when the two inputs are different. By way of example, in the circuit of FIG. 9, when the TTL control signal is set at the H level (logic 1) and when the comparator output is at the H level, the XNOR output 97 will also be at the H level, and when at the L level, its output will also be at the L level. Therefore, the corresponding relation between the logic mark (code) and white-black levels will not be changed (i.e., TTL(B) will be in-phase with TTL. However, when the TTL control signal 96 is set at the L level (logic 0), and when the comparator output is at the L level, the XNOR output 97 will be at the H level, and when the H level, the XNOR output 97 will be at the L level. Therefore, the corresponding relation between the logic mark (code) and white-black levels will be inverted.

Therefore, when the TTL control signal voltage is set at the H level (logic 1), and when a normal black bar code of black bar on white surface is readable, and if the offset signal voltage is set at the L level (logic 0), the inverted bar code of white bar on black surface can be read. Furthermore, if the TTL control voltage is supplied to the XNOR continuously, in alternate sequence, both the terminal bar code and the inverted bar code can be read.

Thereby, irrespective of the connected resistor 95, the increase and expansion of the time constant relative to the capacitor 611, 612 can be avoided. The inverted signal of the offset signal supplied to the middle connecting point of the diode switch (621, 622) determines the spatial level logics (H, L).

In addition to the XNOR gate 91, the circuit of FIG. 9 includes an offset signal generating network comprised of an offset voltage generating source 93 whose output is applied to the input of an inverter 94 whose output is connected to one end of a resistor 95 whose other end is connected to output terminal 66 of the slice generator. The offset voltage network functions to raise or lower the average direct current level at node 66. This may be used to compensate or control a base level for the slice voltage produced at output 66. The amount of shift is controlled by the ohmic value of resistor 95. In FIG. 9 the invertor 94 and the resistor 95 produce a voltage which is applied to the middle connecting point 66 of the diode pair (621, 622). The TTL control signal 96 and the offset voltage signal 93 may be the same signal.

What is claimed is:

1. An optical reading device including:

a light source;

means for projecting light from said light source onto an object containing information to be read;

optic means for imaging light reflected from said object onto an image sensor for converting the reflected light into electric signals having large and rapid peak-to-peak variations and which can be shifted up and down as a function of ambient light; and signal processing circuitry connected to said image sensor for receiving said electric signals and producing, at an input point, a signal voltage (Vin) responsive thereto also having large and rapid peak-to-peak variations; said signal processing circuitry including:

first means for charging a first capacitive node to the peak values of the positive going excursions of Vin;

second means for charging a second capacitive node to the peak values of the negative going excursions of Vin;

first and second unidirectional conducting elements, each element enabling conduction in a forward direction with an offset voltage drop (VF); and means connecting said first unidirectional conducting element between said first capacitive node and an output terminal and said second unidirectional conducting element between said output terminal and said second capacitive node.

2. An optical reading device in accordance with claim 1, wherein;

said signal processing circuitry includes a comparator having first and second inputs and an output;

wherein said first and second unidirectional conducting elements are first and second diodes, respectively;

wherein said first means includes a first peak rectification circuit connected in series with said first diode between said input point and said output terminal;

said first peak rectification circuit being responsive to increasing values of the analog signal for producing a reference signal at said output terminal which is equal to the amplitude of Vin less said offset voltage of said first diode;

wherein said second means includes a second peak rectification circuit connected in series with said second diode connected between said input point and said output terminal; said second peak rectification circuit being responsive to decreasing values of the analog signal for producing a reference signal at said output terminal which is equal to the amplitude of Vin plus said offset voltage of said second diode; and means for applying said Vin to one input of said comparator and the signal at said output terminal to the other input of said comparator.

3. An optical device as claimed in claim 2 wherein each one of said first and second peak rectification circuits includes an operational amplifier and an associated unidirectional conducting element;

wherein the combination of the operational amplifier of the first peak rectification circuit and its associated unidirectional conducting element is responsive to increasing values of the analog signal; and wherein the combination of the operational amplifier of the second peak rectification circuit and its associated unidirectional conducting element is responsive to decreasing values of the analog signal.

4. The optical reading device as claimed in claim 3 wherein each one of said associated unidirectional conducting elements is a junction field-effect transistor (JFET) connected to function like a diode.

5. An optical reading device as claimed in claim 1 wherein said offset voltage (VF) is approximately equal to the forward voltage drop of a diode.

6. An optical reading device as claimed in claim 5 wherein said processing circuitry includes a comparator having first and second inputs and an output;

wherein said signal Vin is applied to the first input of said comparator circuit; and means coupling the second input of said comparator circuit to said output terminal for applying a signal of amplitude Vin minus VF to the second input of said comparator circuit when Vin is increasing in value and for applying a signal of amplitude Vin plus VF to the second input of said comparator circuit when Vin is decreasing in value.

7. A slice circuit for an optical reading device comprising:

an input terminal for the application thereto of an analog signal;

first and second operational amplifiers (Op-Amps); each Op-Amp having first and second inputs and an output;

first and second unidirectional conducting elements;

means connecting the first inputs of said first and second Op-Amps to said input terminal;

means connecting said first unidirectional conducting element between the output of said first Op-Amp and a first output node; said first unidirectional conducting element being poled to conduct conventional current in a first direction;

means connecting said second unidirectional conducting element between the output of said second Op-Amp and a second output node; said second unidirectional conducting element being poled to conduct current in the opposite direction to said first direction;

means connecting said first output node to said second input of said first Op-Amp, and means connecting said second output node to said second input of said second Op-Amp;

first and second capacitors respectively connected to said first and second output nodes for charging to and tending to maintain the peak voltages at their respective nodes;

first and second diodes and an output terminal;

negligible impedance means connecting said first diode between said first output node and said output terminal poled to conduct in said first direction; and negligible impedance means connecting said second diode between said output terminal and said second output node poled to conduct in said second direction.

8. The slice circuit as claimed in claim 7 wherein each one of said unidirectional conducting element is a junction field-effect transistor (JFET).

9. The slice circuit as claimed in claim 7 further including a comparator circuit having first and second inputs and an output;

means connecting said first input of said comparator circuit to said analog input terminal; and means connecting said second input of said comparator circuit to said output terminal.

10. The slice circuit as claimed in claim 9 further including an exclusive OR type circuit coupled to the output of said comparator circuit.

11. The slice circuit as claimed in claims 9 further including offset signal generating circuit coupled to said output terminal.

12. A combination comprising:

an input terminal for the application thereto of an analog input signal (Vin) which undergoes positive and negative going excursions;

a first means coupled to said input terminal responsive to the positive going excursions of Vin for charging a first capacitive node to the positive peak values of Vin;

a second means coupled to said input terminal responsive to the negative going excursions of Vin for charging a second capacitive node to the negative peak values of Vin;

first and second unidirectional conducting elements; each element enabling conduction in a forward direction with a relatively low forward voltage drop (VF) and blocking conduction in a reverse direction;

an output terminal;

means connecting said first unidirectional conducting element between said first capacitive node and said output terminal so as to conduct in the forward direction from said first capacitive node to said output terminal for, in response to increasing values of Vin, producing a signal at said output terminal which is equal Vin minus VF; and means connecting said second unidirectional conducting element between said second capacitive node and said output terminal so as to conduct in the forward direction from said output terminal to said second capacitive node for, in response to decreasing values of Vin, producing a signal at said output terminal which is equal to Vin plus VF.

13. The combination as claimed in claim 12 wherein said first and second unidirectional conducting elements are first and second diodes, respectively, and wherein said first means is a first peak detector circuit and said second means is a second peak detector circuit.

14. The combination as claimed in claim 13 wherein said first and second peak detector circuits include:
   (a) first and second operational amplifiers (Op-Amps); each Op-Amp having first and second inputs and an output;
   (b) third and fourth unidirectional conducting elements;
   (c) means connecting the first inputs of said first and second Op-Amps to said input terminal;
   (d) means connecting said third unidirectional conducting element between the output of said first Op-Amp and said first capacitive node; said third unidirectional conducting element being poled to conduct conventional current in a first direction;
   (e) means connecting said fourth unidirectional conducting element between the output of said second Op-Amp and said second capacitive node; said fourth unidirectional conducting element being poled to conduct current in the opposite direction to said first direction; and
   (f) means connecting said first capacitive node to said second input of said first Op-Amp, and means connecting said second capacitive node to said second input of said second Op-Amp.

15. The combination as claimed in claim 12 further including a comparator circuit having first and second inputs and an output;
   means connecting said first input of said comparator circuit to said input terminal; and
   means connecting said second input of said comparator circuit to said output terminal.

16. The combination as claimed in claim 15 further including an exclusive-OR type circuit having a first input coupled to the output of said comparator circuit and having a second input coupled to a control terminal to which is applied a control signal for producing a signal at the output of said exclusive-OR type circuit which is either in phase or out of phase with the comparator output.

17. The combination as claimed in claim 15 further including an offset signal generating circuit coupled to said output terminal for controlling its steady state level.

* * * * *